Patented Feb. 29, 1944

UNITED STATES PATENT OFFICE 2,343,234

AZO DYE OF THE PYRAZOLONE TYPE

James H. Williams, Riverside, Conn., assignor to American Cyanamid Co., New York, N. Y., a corporation of Maine No Drawing. Application August 20, 1941, Serial No. 407,649

3 Claims. (Cl. 260—162)

This invention relates to azo dyes derivable from sulfanilyl pyrazolones.

A new series of azo dyes can be prepared utilizing sulfanilyl pyrazolones as one of the dye components. The dyes may be considered to have the following general formula:

R—N=N Spz in which R is an aryl radical which may or may not contain further azo groups and Spz is the radical of sulfanilyl pyrazolone.

In general two sub-classes of dyes can be made because sulfanilyl pyrazolones can either be diazotized and coupled with the usual coupling components or aromatic amines can be diazotized and coupled to the sulfanilyl pyrazolones. Polyazo dyes can of course, be made by diazotizing aromatic amines coupling to the pyrazolones and then diazotizing the primary amino group on the sulfanilyl radical and coupling that with further coupling components.

The dyes are, for the most part, of various shades of red and yellow depending on the coupling components, or diazotized amines. In general the first group referred to above produces more reddish shades and the second group more yellowish shades. The invention will be described in greater detail in conjunction with the following specific examples.

Example 1

76 parts of 1-sulfanilyl-3-methyl-5-pyrazolone were dissolved in 600 parts of water with 45 parts of HCl. The solution was then cooled to 5° C. with ice and diazotized with 20.7 parts of sodium nitrite at 5-8° C. After diazotization the mixture was run slowly into a solution to 45 parts of beta-naphthol in 132 parts of 10% sodium hydroxide solution to which 50 parts of a 10% soda ash solution had been added. The reaction mixture was cooled to 0° C. by means of ice. Coupling took place almost instantly and the product was insoluble and was recovered by filtration. It was orange in color and soluble in alcohol and ether. The compound most probably had the following formula:

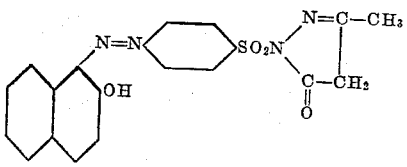

Example 2

A diazo solution was prepared as described in Example 1 and was coupled at 0° C. with a solution containing 90 parts of an 84½% Shaeffers salt, 5 parts of soda ash and 140 parts of water; coupling was rapid and the product obtained was partially water soluble and dyed wool bright yellowish or orangish shades.

Example 3

A diazo solution was prepared as described in Example 1 and was then coupled with gamma acid by forming a slurry of 75 parts of 98% gamma acid dissolved in 270 parts of water containing 15 parts of soda ash. Acetic acid was then added until the solution was acid to a methyl red-yellow indicator paper. Ice was then added to cool to 10° C. and the diazo solution introduced into the slurry. Coupling started and there was a dark red precipitate, coupling being completed by allowing to stand overnight at 10° C. The product was a water-soluble, brick red wool dye.

Example 4

17.2 parts of sulfanilamide were dissolved in 200 cc. of water with 25 cc. concentrated C. P. HCl. On cooling to 5° C., diazotization was carried out in the usual manner with 100 parts of normal sodium nitrite solution.

Meanwhile a solution in NaOH of the pyrazolone was made as follows: 26.5 parts of sulfanilyl pyrazolone was dissolved in 200 cc. of water by heating with 20 parts 5 NaOH. Then 50 parts 10% soda ash was added. After cooling to 0° C. the above diazo was added and coupling ensued almost at once. The product was slightly soluble in the alkaline coupling medium but on acidification it was entirely precipitated as a pale yellow product.

This product was soluble in alcohol and ether as a beautiful bright greenish yellow.

I claim:

1. An azo dye having the following formula:

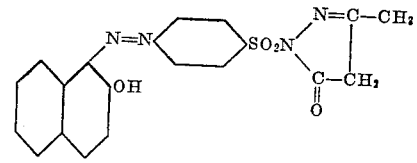

2. An azo dye having the following formula:

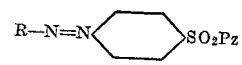

in which R is a radical of an azo coupling component of the naphthalene series and Pz is a pyrazolone radical.

3. An azo dye having the following formula:

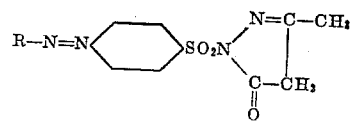

in which R is a radical of an azo coupling component of the naphthalene series.

JAMES H. WILLIAMS.